(12) United States Patent
Roberts et al.

(10) Patent No.: US 6,664,553 B2
(45) Date of Patent: Dec. 16, 2003

(54) TRAP BLACKBODY

(75) Inventors: D. Allan Roberts, Ft. Wayne, IN (US);
Doug Cohen, Ft. Wayne, IN (US);
David S. Smith, Ft. Wayne, IN (US)

(73) Assignee: ITT Defense & Electronics, McLean, VA (US)

( * ) Notice: Subject to any disclaimer, the term of this patent is extended or adjusted under 35 U.S.C. 154(b) by 120 days.

(21) Appl. No.: 09/941,940

(22) Filed: Aug. 30, 2001

(65) Prior Publication Data

US 2003/0042422 A1 Mar. 6, 2003

(51) Int. Cl.[7] .................................................. G01J 1/00
(52) U.S. Cl. .................... 250/504 R; 250/353; 250/351; 250/505.1
(58) Field of Search .............................. 250/504 R, 393, 250/338.3, 353, 351, 505.1; 374/2; 273/348.1; 359/241, 352

(56) References Cited

U.S. PATENT DOCUMENTS 5,739,533 A * 4/1998 Okubo et al. ............ 250/338.3

* cited by examiner

*Primary Examiner*—Stephen D. Meier
*Assistant Examiner*—Lam Nguyen
(74) *Attorney, Agent, or Firm*—McDermott, Will & Emery

(57) ABSTRACT

An apparatus for simulating a blackbody utilizes several plates to absorb and reflect electromagnetic radiation. Electromagnetic radiation entering the apparatus from a certain view is reflected from one plate to another, until the direction of travel of the electromagnetic radiation is reversed. Each time the electromagnetic radiation is reflected, the majority of the electromagnetic radiation is absorbed resulting in a negligible amount of incoming electromagnetic radiation escaping the apparatus.

20 Claims, 3 Drawing Sheets

TOP VIEW

SIDE VIEW

FRONT VIEW

TRAP BLACKBODY

FIELD OF THE INVENTION

The present invention relates to thermal targets, and in particular to thermal targets with a simple construction and high emissivity that simulates a blackbody.

BACKGROUND OF THE INVENTION

Thermal targets are used as radiation sources, primarily for calibrating infrared detectors, which detect electromagnetic radiation in the infrared range, approximately 2 μm to 1000 μm. It is important to accurately calibrate an infrared detector in order for the detector to provide reliable information about the temperatures corresponding to the electromagnetic radiation detected by the detector. Because infrared detectors are subject to shift and drift, it is necessary to periodically recalibrate infrared detectors while in use.

A thermal target's temperature and emissivity needs to be known as accurately as possible in order for a thermal target to be used as a calibration reference. Accurately knowing a thermal target's temperature and emissivity establishes a baseline that correlates a known temperature to an amount of radiation. Such correlation allows an infrared detector to detect the amount of radiation and know what temperature that detected amount of radiation represents. Subsequently, when the infrared detector detects infrared radiation, the baseline radiation amount and corresponding temperature are used to calculate the temperature of the object emitting the infrared radiation. Radiated output, E, from an object is calculated using a modified Stefan-Boltzman equation:

$$E = \epsilon \sigma T^4 \quad \text{(equation 1)}$$

where $\epsilon$ is the calculated emissivity for the object, $\sigma$ represents the Stefan-Boltzman constant, approximately $5.670 \times 10^{-8}$ W/m²-K⁴, and T is the temperature of the object.

Using equation 1, any object could be used to calibrate an infrared detector if the temperature and the emissivity of the object are known. However, determining an object's emissivity depends upon the temperature of the object, the surface characteristics of the object, the wavelength of the emitted radiation, the viewing angle of the object, and other factors and is therefore difficult to determine. Relying upon an object's determined emissivity is not precise enough for accurately calibrating an infrared detector.

For accurate calibration of an infrared detector a thermal target that closely simulates a blackbody, i.e., a theoretical object that is a perfect absorber and emitter of radiation, i.e., $\epsilon = 1$, is used. Use of a blackbody simulator simplifies calculation of the total radiation emitted, E, from a thermal target by relying upon accurate determination of the thermal target's temperature and the Stefan-Boltzman law;

$$E = \sigma T^4 \quad \text{(equation 2)}$$

where $\sigma$ represents the Stefan-Boltzman constant, approximately $5.670 \times 10^{-8}$ W/m²-K⁴ and T is the temperature of the thermal target.

The Stefan-Boltzman law accurately predicts the total radiation emitted for a blackbody at a known temperature. Because the use of thermistors and other temperature measuring devices allow accurate measurements of a thermal target's temperature to within plus or minus 0.1 Kelvin, a blackbody simulator with a high emissivity, i.e., $\epsilon$ greater than 0.99, provides the reliable correlation of detected radiation to temperature needed for calibrating an infrared detector. The better the emissivity of the blackbody simulator, i.e., the closer $\epsilon$ is to 1, the more accurate an infrared detector calibrated using the blackbody simulator can be.

It would appear that a blackbody simulator could be any black object. Such a simulator has been used in the past, but correspondence to a true blackbody has been poor. Many blackbody simulators are formed by creating a cavity in a core material, the cavity forming an aperture on one side of the core. The aperture is used to simulate a flat blackbody, having the shape and size of the aperture. Particular cavity shapes are chosen to cause multiple reflections of radiation within the cavity, and eventual absorption by the cavity walls of the majority of the electromagnetic energy entering the aperture.

Thermal targets simulating black bodies employ multiple reflections in some sort of a cavity to enhance their effective emissivity. If the cavity surface coating of a blackbody simulator has an emissivity above 0.7, then most cavity shapes in commercial use in blackbody simulators result in a device in which the on-axis emissivity of the aperture exceeds 0.99. Primary differences between thermal targets are the shape of the internal cavity, and the finish on the surfaces inside the cavity. Other important parameters are the size ratio of aperture to volume, weight, complexity, uniformity of emissivity, and robustness.

Since thermal target designs attempt to maximize emissivity, one measure of the quality of a thermal target is how many nines the thermal target is capable of. An emissivity of 0.9, one nine, is usually unacceptable. Many thermal targets work in the range of 0.985 to 0.995, two nines. For accurately calibrating infrared detectors, an emissivity of at least 0.999, three nines, is required to ensure accurate measurements by the infrared device. Some laboratory grade instruments have emissivities in the four nine range.

A blackbody simulator with a large cavity and a very small aperture emits almost none of the radiation that enters the aperture because of the high ratio of volume to aperture size of the cavity, i.e., emissivity is in the three to four nine range. A high ratio of cavity volume to aperture size results in blackbody simulators with a large volume and a comparatively small aperture. Although such blackbody simulators have a high emissivity, they are often heavy, bulky, and not easily transported, making them ill suited for many applications requiring a blackbody simulator.

An additional disadvantage of high volume, small aperture blackbody simulators is that the aperture provides only a small field of blackbody radiation, making alignment of an infrared detector with the blackbody simulator critical. For example, in an airborn or spaceborn infrared detection system utilizing blackbody simulators to periodically calibrate the detector, jolts or bumps that occur during flight can misalign the detector from the blackbody radiation field, thereby disabling calibration of the detector during in-flight use. Decreasing the size of the volume, or increasing the size of the aperture, results in a blackbody simulator that is less heavy and less bulky, and/or has a larger blackbody radiation field, however, the emissivity is also lowered because the lower ratio of volume to aperture size allows more incoming electromagnetic radiation to escape the blackbody simulator.

Another drawback to current blackbody simulators is polarization of electromagnetic radiation that escapes the blackbody simulator. Such polarized output results in lower emissivities because some forms of polarized light have a lower emissivity than other forms of polarized light.

A further disadvantage of current blackbody simulators is that complex surfaces on the inside of a volume, although useful for preventing incoming light from escaping through the aperture, are difficult to manufacture and are often fragile. During mobile use of infrared detection systems, i.e., in-flight or in combat situations, the fragile surfaces may become damaged and reduce the emissivity of the blackbody. Such a reduction in emissivity causes the infrared detector in the system to become less accurate and less able to distinguish objects in cluttered infrared fields, i.e., where an object's temperature is close to the temperature of its surroundings. Complex surfaces also result in random reflection of incoming light, which causes non-uniform emissivity for the blackbody simulator.

Considering the above drawbacks of current blackbody simulators, there exists a need for a thermal target that closely approximates a blackbody with a low ratio of volume to aperture and high emissivity. There exists a particular need for such a thermal target having uniform emissivity and non-polarized output. There is also a need for a thermal target that is simple and rugged.

SUMMARY OF THE INVENTION

An objective of the present invention is to provide a blackbody simulator that is easy to construct, rugged, and lightweight. Another objective of the present invention is to provide a blackbody simulator that contains a large aperture, and has a high emissivity. A further objective of the present invention is to provide a blackbody thermal target that does not emit polarized light.

These and other objectives are met by embodiments of the present invention, which provide a blackbody thermal target for use as a calibration radiation source for infrared detectors. The present invention provides a field of view where electromagnetic radiation traveling along the field of view enters a trap and undergoes multiple reflections off of substantially flat plates. The substantially flat plates absorb the electromagnetic radiation and reflect the un-absorbed remainder, eventually reversing the electromagnetic radiations direction of travel so that only a tiny residual of the entering electromagnetic radiation escapes the trap into the field of view.

Accordingly, one aspect of the invention relates to an electromagnetic radiation trap comprising substantially flat plates; and structure to hold the substantially flat plates in angled relation to one another. Of the plates, one plate is a primary plate; and electromagnetic radiation striking a surface of the primary plate is substantially absorbed by the primary plate with the remainder of the electromagnetic radiation being reflected onto a surface of another flat plate. The flat plates are arranged so that the diminishing electromagnetic radiation is reflected onto at least a surface of each flat plate and eventually strikes a flat plate substantially orthogonally, causing the remaining electromagnetic radiation to substantially retrace its path from plate to plate and emerge from the electromagnetic radiation trap traveling in the general direction from which the electromagnetic radiation entered the trap.

Another aspect of the present invention relates to an electromagnetic radiation trap comprising: a first substantially flat plate, a second substantially flat plate, and a third substantially flat plate, each having a top surface and a bottom surface. There is a finish on the bottom surface of the first plate that absorbs electromagnetic radiation and reflects remaining electromagnetic radiation without scattering the remaining electromagnetic radiation. There is a finish on the top surface of the second plate that absorbs electromagnetic radiation and reflects remaining electromagnetic radiation without scattering the remaining electromagnetic radiation. There is also a finish on the top surface of the third plate that absorbs electromagnetic radiation and reflects remaining electromagnetic radiation without scattering the remaining electromagnetic radiation. The electromagnetic radiation trap also comprises structure to hold the substantially flat plates in angled relation to one another. As part of the angled relation of the plates to one another, the first plate and the second plate are tilted at approximately the same angle with respect to a common plane, and the top surface of the second plate views the bottom surface of the first plate. Another aspect of the angled relation of the plates to one another has the top and bottom surfaces of the third plate substantially orthogonal to the common plane; and the top surface of the third plate viewing the top surface of the second plate.

In certain embodiments, the electromagnetic radiation trap further comprises: a fourth substantially flat plate, and a fifth substantially flat plate, each having a top surface and a bottom surface. There is a finish on the top surface of the fourth plate that absorbs electromagnetic radiation and reflects remaining electromagnetic radiation without scattering the remaining electromagnetic radiation; and a finish on the top surface of the fifth plate that absorbs electromagnetic radiation and reflects remaining electromagnetic radiation without scattering the remaining electromagnetic radiation. The first plate and the fourth plate are tilted at approximately the same angle with respect to the common plane, and the top surface of the fourth plate views the bottom surface of the first plate. Part of the angled relation of the plates to one another has the top and bottom surfaces of the fifth plate substantially orthogonal to the common plane, and includes the top surface of the fifth plate viewing the top surface of the fourth plate.

Another aspect of the present invention relates to an infrared detecting apparatus comprising: an infrared detector; and an electromagnetic radiation trap. The electromagnetic radiation trap comprises: substantially flat plates; and structure to hold the substantially flat plates in angled relation to one another. Of the plates, one plate is a primary plate; and electromagnetic radiation striking a surface of the primary plate is substantially absorbed by the primary plate with the remainder of the electromagnetic radiation being reflected onto a surface of another substantially flat plate. The substantially flat plates are arranged so that the diminishing electromagnetic radiation is reflected onto at least a surface of each flat plate and eventually strikes a flat plate substantially orthogonally, causing the remaining electromagnetic radiation to substantially retrace its path from plate to plate and emerge from the electromagnetic radiation trap traveling in the general direction from which the electromagnetic radiation entered the trap.

Yet another aspect of the present invention relates to an infrared detecting apparatus comprising: an infrared detector; and an electromagnetic radiation trap. The electromagnetic radiation trap comprises: a first substantially flat plate, a second substantially flat plate, and a third substantially flat plate, each having a top surface and a bottom surface. There is a finish on the bottom surface of the first plate that absorbs electromagnetic radiation and reflects remaining electromagnetic radiation without scattering the remaining electromagnetic radiation. There is a finish on the top surface of the second plate that absorbs electromagnetic radiation and reflects remaining electromagnetic radiation without scattering the remaining electromagnetic radiation. There is also a finish on the top surface of the third plate that absorbs electromagnetic radiation and reflects remaining electromagnetic radiation without scattering the remaining electromagnetic radiation. The electromagnetic radiation trap also comprises structure to hold the substantially flat plates in angled relation to one another. As part of the angled relation of the plates to one another the first plate and the second plate are tilted at approximately the same angle with respect to a common plane, and the top surface of the second plate views the bottom surface of the first plate. Another aspect of the angled relation of the plates to one another has the top and bottom surfaces of the third plate substantially orthogonal to the common plane; and the top surface of the third plate viewing the top surface of the second plate.

One of the advantages of the present invention is that the blackbody simulator is rugged and lightweight so that it is easily incorporated into sensors, such as spaceborn, airborn or mobile ground-based infrared detectors. Another advantage of the present invention is that the blackbody simulator does not emit polarized light. A further advantage of the present invention is the ability to obtain a high emissivity by increasing the number of reflections that incoming radiation goes through. Yet another advantage of the present invention is the small cavity volume compared to the size of the radiating aperture, which enables construction of a compact, lightweight blackbody simulator.

Additional advantages and other features of the present invention will be set forth in part in the description which follows, and in part will become apparent to those having ordinary skill in the art on examination of the following, or may be learned by practice of the invention. The advantages of the present invention may be realized and obtained as particularly pointed out in the appended claims.

DETAILED DESCRIPTION OF THE INVENTION

Reference will now be made in detail to the present preferred embodiments of the invention, examples of which are illustrated in the accompanying drawings.

Figure 1:
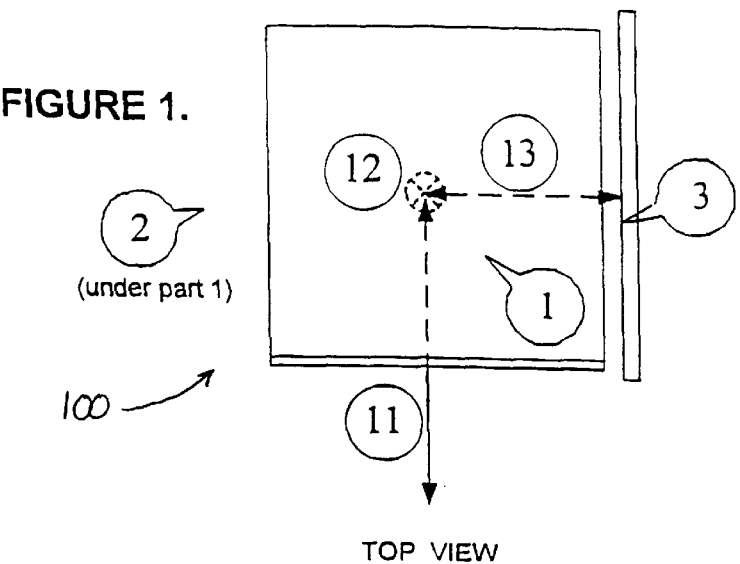
FIG. 1 depicts a top view of an embodiment of the present invention where three plates are used to reflect electromagnetic radiation.
Figure 2:
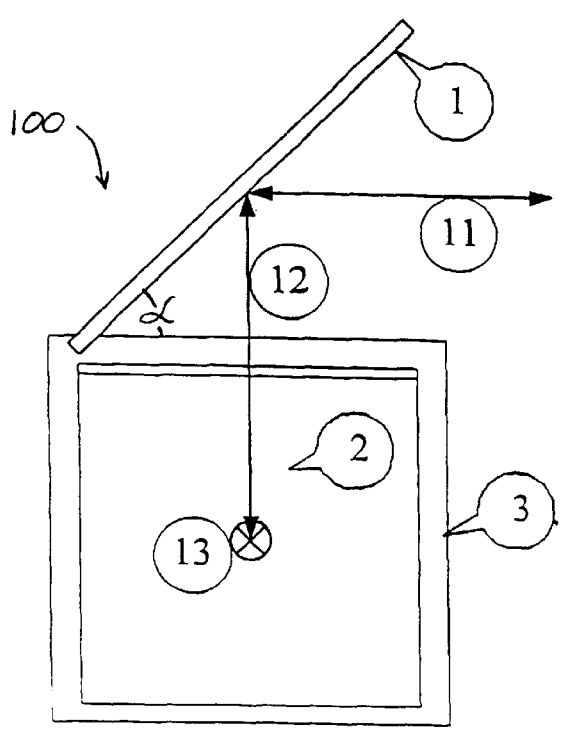
FIG. 2 depicts a side view of the embodiment of the present invention depicted in FIG. 1.
Figure 3:
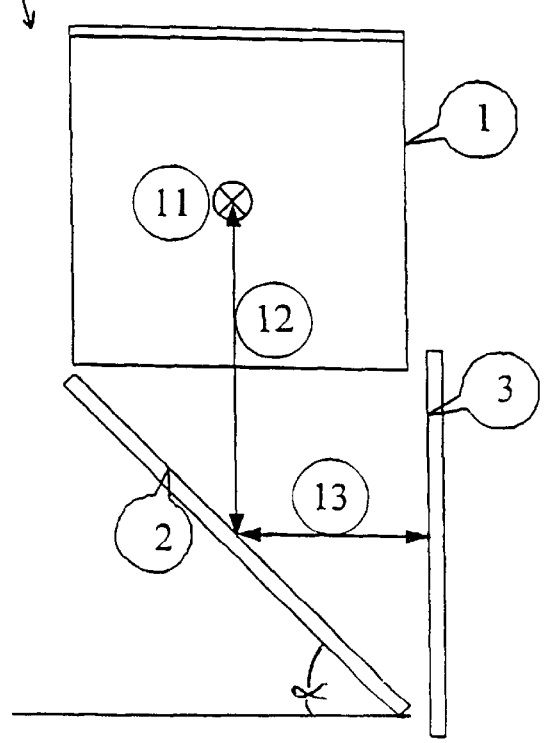
FIG. 3 depicts a front view of the embodiment of the present invention depicted in FIG. 1.

Referring now to FIGS. 1, 2, and 3, an exemplary electromagnetic radiation trap, i.e., a blackbody simulator, comprises three optical surfaces, plates 1, 2, and 3, held at angles with respect to one another. Plates 1, 2, and 3 are held in angled relation to one another by attachment to one another either directly or through structure such as brackets, additional plates or other structure capable of holding plates 1, 2, and 3 in place. For illustrative purposes, attachment of plates 1, 2, and 3 to one another is not depicted in FIGS. 1 through 3. The optical surfaces are made to be substantially flat by polishing or other well known methods. The optical surfaces are finished or coated such that electromagnetic radiation striking one of them will be either absorbed by the optical surface or reflected, with very little of the radiation scattered. Such finishes and coatings are well known in the art. For example, a popular coating is Lord Corporation's AEROGLAZE.TM. Z-302.

Since emissivity is equal to one minus reflectivity, and reflectivity is easier to analyze, a typical light ray, i.e., electromagnetic radiation, traveling along paths designated as 11, 12 and 13 is traced through the trap. Referring to FIG. 2, electromagnetic radiation traveling to the left along path 11 enters the trap 100 from the right and strikes optical surface 1. Most of the electromagnetic energy is absorbed by optical surface 1, and the remainder of the electromagnetic radiation is reflected downward along path 12. The electromagnetic radiation then strikes optical surface 2.

Referring to FIG. 3, when the electromagnetic radiation strikes optical surface 2 the majority of the electromagnetic energy is again absorbed, this time by optical surface 2. The remainder of the electromagnetic radiation is reflected off of optical surface 2 to the right along path 13. The electromagnetic radiation strikes optical surface 3, where most of the remaining electromagnetic energy is again absorbed. Optical surface 3 is arranged in such a manner as to reflect the electromagnetic radiation substantially along the same path 13 that the electromagnetic radiation took to reach optical surface 3. In FIG. 3, the reflected electromagnetic radiation travels to the left along path 13 to strike optical surface 2. The majority of the electromagnetic energy of the electromagnetic radiation is again absorbed by optical surface 2, and the remaining radiation is reflected substantially along path 12.

Referring to FIG. 2, the remaining radiation travels along path 12 in an upward direction to strike optical surface 1. Optical surface 1 again absorbs the majority of the electromagnetic radiation of the remaining light ray. At this point, the tiny residual energy remaining in the light ray escapes the trap 100 in the general direction of path 11.

The optical surfaces 1, 2, and 3 are held in relation to one another such that certain surfaces view other surfaces. From the standpoint of an infrared detector, the view of the trap 100 is substantially along path 11. In other words, an infrared detector "sees" radiation radiated from trap 100 that travels along paths substantially parallel to path 11, as well reflected radiation from light entering trap 100 along path 11.

Surface 2 views surface 1 in that electromagnetic radiation entering trap 100 substantially along path 11 and striking surface 1 is reflected onto surface 2. Surface 3 views surface 2 in that light reflected from surface 1, onto surface 2, is subsequently reflected onto surface 3. In turn, surface 2 views surface 3 in that light reflected from surface 1 onto surface 2 and then onto surface 3 is subsequently reflected back to surface 2. Surface 1 views surface 2 in that light reflected from surface 1 onto surface 2 onto surface 3 then onto surface 2 is subsequently reflected onto surface 1. By arranging surfaces 1, 2, and 3 to view one another in the described manner, light entering along path 11 is absorbed each time it strikes a surface, 1, 2, or 3. Only a minute amount of the entering light is reflected out of trap 100 along path 11. Therefore, an infrared detector that views surface 1 along path 11, see FIG. 5 for example, detects primarily radiation that is emitted from surface 1 with only trace amounts of reflected radiation being included. Thus, only trap 100 appears to be a blackbody to the infrared detector, and by knowing the temperature of trap 100, specifically of surface 1, the infrared detector can be accurately calibrated.

The path 11, 12, 13, taken by the light ray, involves 5 "bounces", i.e., reflections, off of optical surfaces. At each bounce, a significant amount of energy is absorbed from the light ray into the optical surface. For example, if the single surface absorption is 75% then 99.9% of the total input energy of the light ray will be absorbed, leaving only 0.1% to be reflected out of the trap. Typical light absorption capabilities for current optical surfaces are much better than 75%, thus giving a trap built according to the present invention a large blackbody area and a small corresponding volume. More than three plates are utilized in certain embodiments of the present invention, resulting in a greater number of bounces for a light ray and a higher emissivity, i.e., closer to 1, for the trap.

As best depicted in FIG. 3, the blackbody area of a trap built according to the present invention depends upon the size of surface 1, and not the overall ratio of aperture size to volume. The blackbody area of surface 1 used to calibrate infrared detectors is preferably the central portion of surface 1, approximately 50% to 70% of the area of surface 1.

Light entering trap 100 along path 11 is partially polarized after striking optical surface 1 and being reflected 90° from its initial path. Analysis of this type of reflection shows that the light breaks into 2 planes, called the S and P planes. The S plane usually contains a much higher amount of light than the polarization plane, P. If such light were to escape the trap, the emissivity would not be uniform. The trap 100 solves this problem by turning surface 2 so that light ray path 13 is perpendicular to light ray path 11, referring to FIG. 1. Reflection of the light from surface 2 turns the S plane light off surface 1 into P plane light and vice versa, so that there is no favored direction for polarization. This results in uniform emissivity from trap 100 along the path 11.

The trap blackbody simulator 100 depicted in FIGS. 1, 2 and 3 is constructed of three optical surfaces 1, 2, and 3 that absorb a light ray and reflect the remainder without substantially scattering the reflected remainder of the light ray. For example the three optical surfaces 1, 2, and 3 comprise metal plates that are finished or treated to absorb electromagnetic radiation and reflect the remaining radiation without scatter, as is well known in the industry. The three metal plates are held in an angled relation to one another so that a light ray path 11, 12, 13 is created where a light ray goes through 5 bounces before leaving the trap 100. The tilt angle a of surfaces 1 and 2 is somewhat arbitrary, but should be substantially equal to one another. In one embodiment of the present invention, the tilt angle of surfaces 1 and 2 is approximately 45°. Surface 3 is arranged in a manner such that a light ray reflected from surface 2 strikes surface 3 then travels along substantially the same path 13 to strike surface 2. Changing the angle of the plates allows additional plates to be inserted to intercept the incoming light ray. Additional plates increase the number of reflections the light ray is subjected to, and thus increases the emissivity of trap 100.

Any conventional manner can be used to hold the 3 surfaces together, for example, providing structure that the three surfaces 1, 2, and 3 are attached to, or attaching the plates directly to one another. For example, if the plates containing surfaces 1, 2, and 3 are metal, attachment can be by welding, soldering, riveting, screws, adhesives, or other known manners for rigidly attaching one body to another. The attachment utilized to hold the three plates together should take into consideration the materials the plates are made of and temperatures at which the trap will be operated, so that heat or cold does not adversely affect the attachment of the plates. In certain embodiments, the surfaces 1, 2, and 3 are thermally isolated from one another.

Additional enhancements made to the trap blackbody of the present invention include thermal control heaters or coolers, insulation, temperature indicators such as thermistors, and support brackets as is well known in the art.

Figure 4:
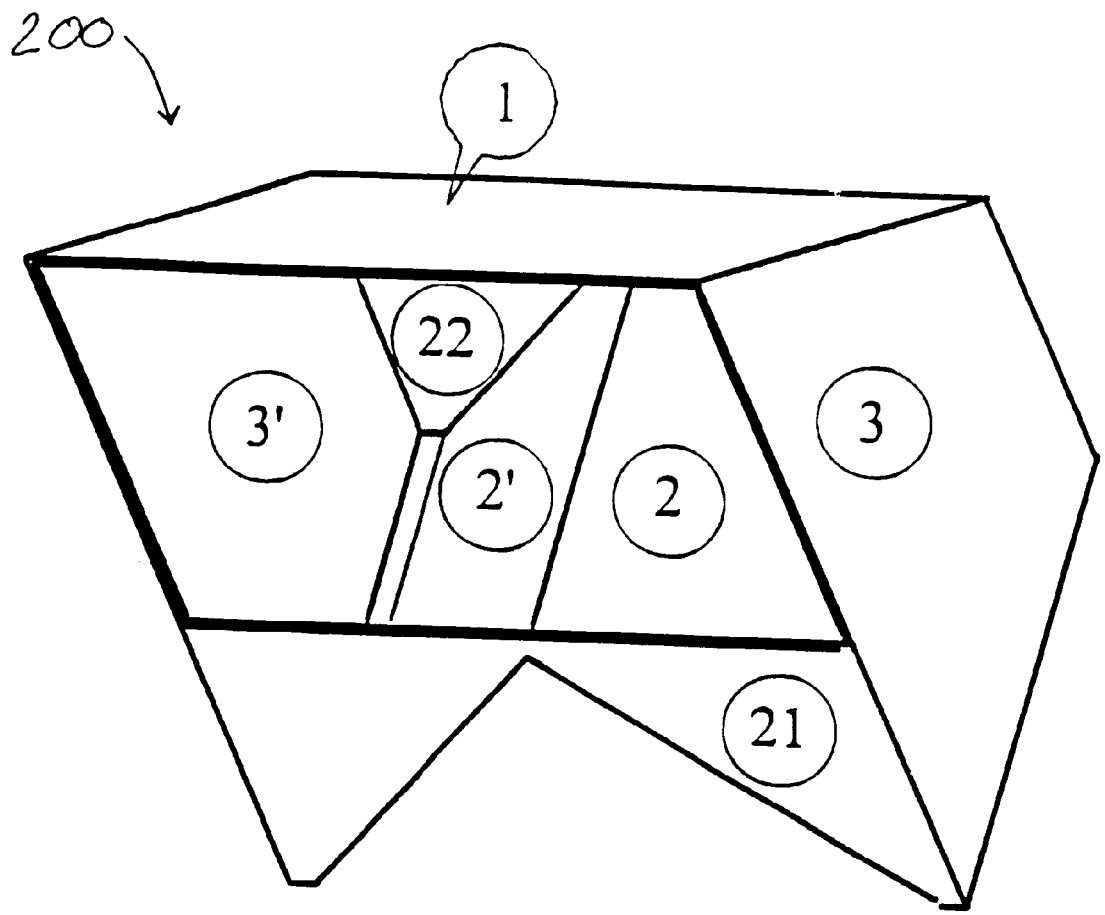
FIG. 4 depicts a perspective view of another embodiment of the present invention.

Referring to FIG. 4, another exemplary embodiment of the present invention is depicted. Trap blackbody 200 comprises an optical surface 1, an optical surface 2, and an optical surface 3, arranged in relation to one another as depicted in FIGS. 1, 2 and 3. The trap blackbody 200 of FIG. 4 also comprises an optical surface 2', and an optical surface 3', that are arranged in relation to optical surface 1, also as depicted in FIGS. 1, 2 and 3. Such arrangements of optical surfaces result in a sub-divided aperture. The trap blackbody 200 is essentially 2 trap blackbodies 100 placed side by side.

Figure 5:
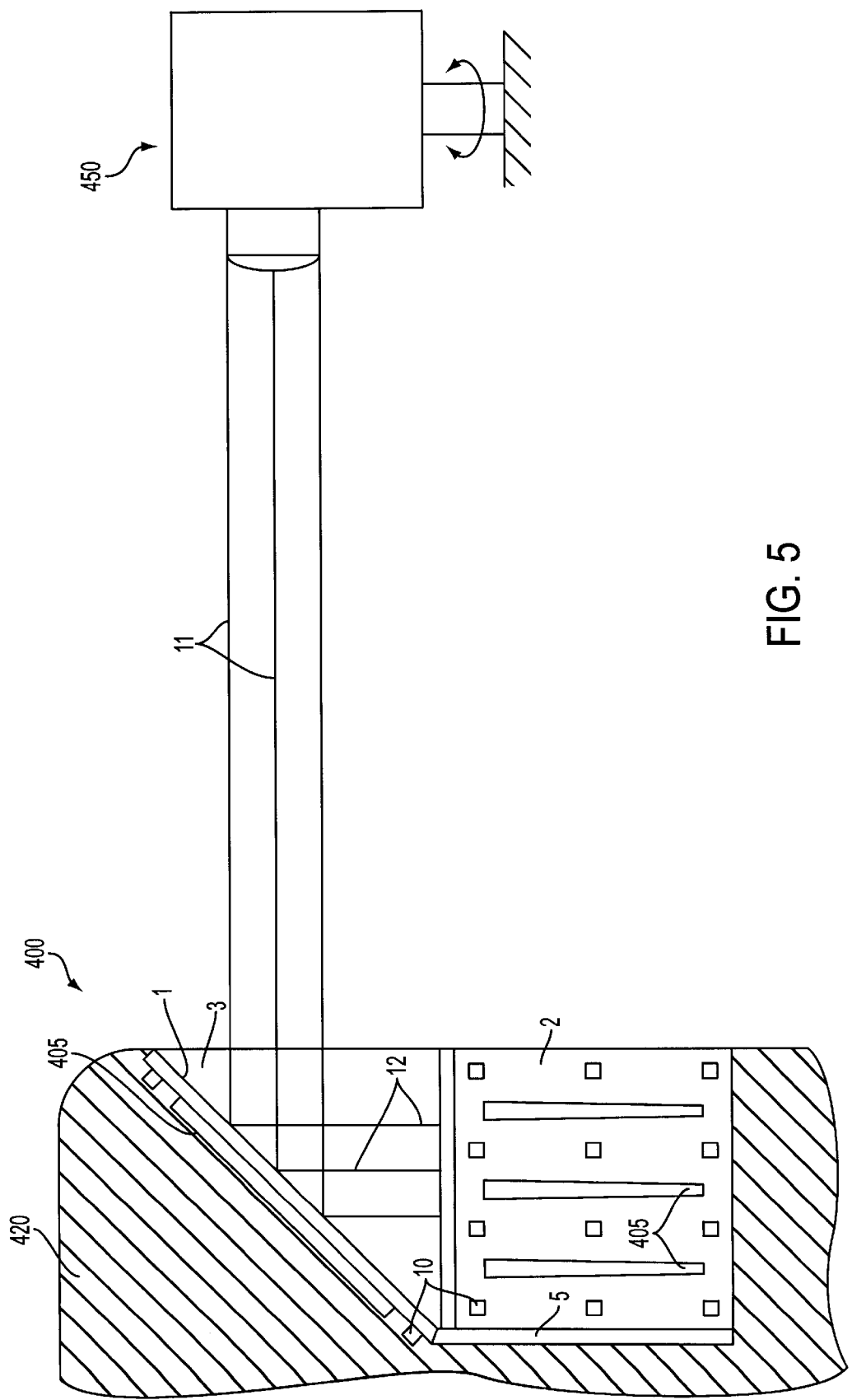
FIG. 5 depicts a schematic view of an infrared detection system utilizing a radiation trap according to an embodiment of the present invention.

Referring to FIG. 5, an infrared detector 450 is positioned such that it detects electromagnetic radiation traveling in the direction of paths 11. The infrared detector 450 is positioned in such a manner because the majority of radiation detected by the detector 450 is radiation emitted from the trap 400, not reflected radiation resulting from light striking the trap 400. The majority of radiation detected by detector 450 is emitted by trap 400 because most of the incoming light traveling along path 11 and striking the trap 400 is absorbed by the five bounce path off of the three optical surfaces 1, 2, and 3 of the trap 400. Thus, the trap 400 acts as a blackbody simulator along paths 11.

As seen in the cut-away view of the trap 400, thermal control units 405 are attached to the back sides of surfaces 1, 2, and 3 in order to control the temperature of surfaces 1, 2, and 3. An insulating material 420 surrounds surfaces 1, 2, and 3 in order to maintain the temperature of surfaces 1, 2, and 3 while reducing the power supplied to units 405 needed to control the temperature of surfaces 1, 2, and 3. Temperature sensors 410 are also attached to the back sides of surfaces 1, 2, and 3 to provide precise temperature information. Although not shown, such temperature information can be fed directly into detector 450 to assist with calibrating detector 450. Insulating materials, temperature controllers, temperature sensors, and the use of such components, are well known in the art and are therefore not discussed in detail.

Although the present invention has been described using three optical surfaces, the same concept of reflecting a light ray along a substantially similar path can be used to add extra bounces by using extra plates which results in an even higher emissivity of the trap blackbody.

In the previous description, numerous specific details are set forth, such as specific materials, structures, chemicals, processes, etc., in order to provide a better understanding of the present invention. However, the present invention can be practiced without resorting to the details specifically set forth. In other instances, well-known processing structures have now been described in detail in order not to obscure the present invention.

Only the preferred embodiments of the invention and but a few examples of its versatility are shown and described in the present disclosure. It is to be understood that the invention is capable of use in various other combinations and environments, and is capable of changes and modifications within the scope of the invention concept as expressed herein.

What is claimed is:

1. An electromagnetic radiation trap comprising:
   at least three substantially flat plates; and
   structure to hold the substantially flat plates in angled relation to one another;
   wherein:
   one plate is a primary plate;
   electromagnetic radiation striking a surface of the primary plate is substantially absorbed by the primary plate with the remainder of the electromagnetic radiation being reflected onto a surface of another substantially flat plate; and
   the substantially flat plates are arranged so that the diminishing electromagnetic radiation is reflected onto at least a surface of each substantially flat plate and eventually strikes a substantially flat plate substantially orthogonally, causing the remaining electromagnetic radiation to substantially retrace its path from plate to plate and emerge from the electromagnetic radiation trap traveling in the general direction from which the electromagnetic radiation entered the trap.

2. The electromagnetic radiation trap according to claim 1, further comprising:
   a finish or coating on each of the surfaces of the plates that the electromagnetic radiation strikes that increases absorption of electromagnetic radiation, and reflects any remaining electromagnetic radiation without scattering the remaining electromagnetic radiation.

3. The electromagnetic radiation trap according to claim 1, wherein the structure to hold the substantially flat plates in angled relation to one another comprises:
   rigid attachment of the plates to one another.

4. The electromagnetic radiation trap according to claim 3, wherein:
   the plates are made of metal.

5. The electromagnetic radiation trap according to claim 4, wherein:
   rigid attachment of the plates to one anther is by welding.

6. An electromagnetic radiation trap comprising:
   substantially flat plates; and
   structure to hold the substantially flat plates in angled relation to one another;
   wherein:
   one plate is a primary plate;
   electromagnetic radiation striking a surface of the primary plate is substantially absorbed by the primary plate with the remainder of the electromagnetic radiation being reflected onto a surface of another flat plate; and
   the flat plates are arranged so that the diminishing electromagnetic radiation is reflected onto at least a surface of each flat plate and eventually strikes a flat plate substantially orthogonally, causing the remaining electromagnetic radiation to substantially retrace its path from plate to plate and emerge from the electromagnetic radiation trap traveling in the general direction from which the electromagnetic radiation entered the trap; and
   the structure to hold the substantially flat plates in angled relation to one another comprises:
      additional plates that do not substantially affect the electromagnetic radiation striking and reflected from the primary plate; wherein
      each additional plate is rigidly connected to two or more of the substantially flat plates.

7. The electromagnetic radiation trap according to claim 6, wherein:
   the plates are made of metal.

8. The electromagnetic radiation trap according to claim 7, wherein:
   rigid connection of the substantially flat plates to the additional plates is accomplished by welding.

9. The electromagnetic radiation trap according to claim 1, further comprising:
   thermal control elements to control the temperature of the plates.

10. The electromagnetic radiation trap according to claim 9, further comprising:
    temperature sensors that indicate the temperature of the plates.

11. The electromagnetic radiation trap according to claim 9, further comprising:
    insulating material surrounding the plates.

12. An electromagnetic radiation trap comprising:
    a first substantially flat plate, a second substantially flat plate, and a third substantially flat plate, each having a top surface and a bottom surface;
    a finish on the bottom surface of the first plate that absorbs electromagnetic radiation and reflects remaining electromagnetic radiation without scattering the remaining electromagnetic radiation;
    a finish on the top surface of the second plate that absorbs electromagnetic radiation and reflects remaining electromagnetic radiation without scattering the remaining electromagnetic radiation;
    a finish on the top surface of the third plate that absorbs electromagnetic radiation and reflects remaining electromagnetic radiation without scattering the remaining electromagnetic radiation; and
    structure to hold the substantially flat plates in angled relation to one another;
    wherein:
    the first plate and the second plate are tilted at approximately the same angle with respect to a common plane;
    the top surface of the second plate views the bottom surface of the first plate;
    the top and bottom surfaces of the third plate are substantially orthogonal to the common plane; and
    the top surface of the third plate views the top surface of the second plate.

13. The electromagnetic radiation trap according to claim 12, further comprising:
    a fourth substantially flat plate, and a fifth substantially flat plate, each having a top surface and a bottom surface;
    a finish on the top surface of the fourth plate that absorbs electromagnetic radiation and reflects remaining electromagnetic radiation without scattering the remaining electromagnetic radiation;
    a finish on the top surface of the fifth plate that absorbs electromagnetic radiation and reflects remaining electromagnetic radiation without scattering the remaining electromagnetic radiation; wherein
    the first plate and the fourth plate are tilted at approximately the same angle with respect to the common plane;
    the top surface of the fourth plate views the bottom surface of the first plate;
    the top and bottom surfaces of the fifth plate are substantially orthogonal to the common plane; and the top surface of the fifth plate views the top surface of the fourth plate.

14. An infrared detecting apparatus comprising:

an infrared detector; and an electromagnetic radiation trap comprising:
at least three substantially flat plates; and
structure to hold the substantially flat plates in angled relation to one another;

wherein:

one plate is a primary plate;

electromagnetic radiation striking a surface of the primary plate is substantially absorbed by the primary plate with the remainder of the electromagnetic radiation being reflected onto a surface of another substantially flat plate; and the substantially flat plates are arranged so that the diminishing electromagnetic radiation is reflected onto at least a surface of each substantially flat plate and eventually strikes a substantially flat plate substantially orthogonally, causing the remaining electromagnetic radiation to substantially retrace its path from plate to plate and emerge from the electromagnetic radiation trap traveling in the general direction from which the electromagnetic radiation entered the trap.

15. An infrared detecting apparatus comprising:

an infrared detector; and an electromagnetic radiation trap comprising:
a first substantially flat plate, a second substantially flat plate, and a third substantially flat plate, each having a top surface and a bottom surface;
a finish on the bottom surface of the first plate that absorbs electromagnetic radiation and reflects remaining electromagnetic radiation without scattering the remaining electromagnetic radiation;
a finish on the top surface of the second plate that absorbs electromagnetic radiation and reflects remaining electromagnetic radiation without scattering the remaining electromagnetic radiation;
a finish on the top surface of the third plate that absorbs electromagnetic radiation and reflects remaining electromagnetic radiation without scattering the remaining electromagnetic radiation; and
structure to hold the substantially flat plates in angled relation to one another;

wherein:

the first plate and the second plate are tilted at approximately the same angle with respect to a common plane;

the top surface of the second plate views the bottom surface of the first plate;

the top and bottom surfaces of the third plate are substantially orthogonal to the common plane; and the top surface of the third plate views the top surface of the second plate.

16. An electromagnetic radiation trap comprising:

at least three substantially flat plates; and structure to hold the substantially flat plates in angled relation to one another;

wherein:

one plate is a primary plate;

electromagnetic radiation striking a surface of the primary plate is substantially absorbed by the primary plate with the remainder of the electromagnetic radiation being reflected onto a surface of another substantially flat plate; and the substantially flat plates are arranged so that the diminishing electromagnetic radiation is substantially absorbed by each substantially flat plate with the remainder of the electromagnetic radiation being reflected onto at least a surface of each substantially flat plate and eventually strikes a substantially flat plate substantially orthogonally, causing the remaining electromagnetic radiation to substantially retrace its path from plate to plate and emerge from the electromagnetic radiation trap traveling in the general direction from which the electromagnetic radiation entered the trap.

17. The electromagnetic radiation trap according to claim 16, further comprising:

a finish or coating on each of the surfaces of the plates that the electromagnetic radiation strikes that increases absorption of electromagnetic radiation, and reflects any remaining electromagnetic radiation without scattering the remaining electromagnetic radiation.

18. The electromagnetic radiation trap according to claim 16, further comprising:

thermal control elements to control the temperature of the plates.

19. The electromagnetic radiation trap according to claim 18, further comprising:

temperature sensors that indicate the temperature of the plates.

20. The electromagnetic radiation trap according to claim 18, further comprising:

insulating material surrounding the plates.

* * * * *